(12) United States Patent
Botkin

(10) Patent No.: US 9,371,102 B1
(45) Date of Patent: Jun. 21, 2016

(54) BICYCLE SEAT ASSEMBLY

(71) Applicant: Mark Botkin, Calgary (CA)

(72) Inventor: Mark Botkin, Calgary (CA)

( * ) Notice: Subject to any disclaimer, the term of this patent is extended or adjusted under 35 U.S.C. 154(b) by 0 days.

(21) Appl. No.: 14/620,220

(22) Filed: Feb. 12, 2015

(51) Int. Cl.
| | |
|---|---|
| *B62J 1/00* | (2006.01) |
| *B62J 1/18* | (2006.01) |
| *B62J 1/04* | (2006.01) |
| *B62J 1/08* | (2006.01) |
| *B62J 1/12* | (2006.01) |

(52) U.S. Cl.
CPC .... *B62J 1/18* (2013.01); *B62J 1/04* (2013.01); *B62J 1/08* (2013.01); *B62J 1/12* (2013.01); *B62J 2001/085* (2013.01)

(58) Field of Classification Search
CPC .................. B62J 1/00; B62J 1/04; B62J 1/08
USPC .................................. 297/195.1, 215.15, 313
See application file for complete search history.

(56) References Cited

U.S. PATENT DOCUMENTS

| | | | | |
|---|---|---|---|---|
| 512,008 | A | | 1/1894 | Cavanaugh |
| 2,395,346 | A | * | 2/1946 | Schwinn ..................... B62J 1/00 297/207 |
| 3,302,970 | A | * | 2/1967 | Rizzato ...................... B62J 1/08 297/215.15 |
| 3,807,793 | A | | 4/1974 | Jacobs |
| 3,874,730 | A | | 4/1975 | Marchello |
| 4,363,516 | A | | 12/1982 | Braly et al. |
| 5,007,675 | A | * | 4/1991 | Musto ........................ B62J 1/08 297/215.14 |
| 5,048,891 | A | * | 9/1991 | Yach .......................... B62J 1/04 297/215.14 |
| 5,352,016 | A | | 10/1994 | Hobson |
| 5,441,327 | A | | 8/1995 | Sanderson |
| 5,921,625 | A | | 7/1999 | Muser |
| 5,997,087 | A | * | 12/1999 | Stumpf .................... A47C 3/03 297/301.7 |
| 6,116,683 | A | | 9/2000 | Maier |
| 6,135,550 | A | | 10/2000 | Tucho |

(Continued)

FOREIGN PATENT DOCUMENTS

| | | |
|---|---|---|
| CA | 2150217 A1 | 12/1995 |
| CN | 2197277 Y | 8/1994 |

(Continued)

*Primary Examiner* — David R Dunn
*Assistant Examiner* — Alexander Harrison

(57) ABSTRACT

A bicycle seat assembly can include a mounting portion, a seat portion, a locking portion, and an actuator portion. The mounting portion can be configured to engage a frame of a bicycle. The seat portion can be pivotally mounted to the mounting portion. The locking portion can be disposed to selectively lock the mounting portion and the seat portion with respect to one another in a plurality of different seat positions. The seat portion can be moveable among the plurality of different seat positions when the locking portion is in an unlocked configuration and can be fixed in one of the plurality of different seat positions when the locking portion is in a locked configuration. The actuator portion can be engaged with the locking portion and operable to shift the locking portion from the locked configuration to the unlocked configuration. The actuator portion can be hand-operated. Another bicycle seat assembly can include a mounting portion and a seat portion. The seat portion can be engaged with the mounting portion. The seat portion can include a frame, a fabric member, and at least one tension adjuster. The frame can define a perimeter and an opening within the perimeter. The fabric member can be arranged on the frame and extend across the opening. The at least one tension adjuster can be operably engaged with the fabric member to adjust a tautness of the fabric member in a lateral direction of the seat portion.

9 Claims, 11 Drawing Sheets

(56) References Cited

U.S. PATENT DOCUMENTS

| | | |
|---|---|---|
| 6,139,098 A | 10/2000 | Carrillo |
| 6,286,901 B1 * | 9/2001 | Ritch ............... A47C 3/04 297/239 |
| 6,874,849 B1 | 4/2005 | Cox |
| 7,494,181 B2 | 2/2009 | Tucker |
| 7,976,102 B2 | 7/2011 | Chang |
| 8,002,347 B2 * | 8/2011 | Geyer ............... B62J 1/00 297/195.1 |
| 8,480,170 B2 * | 7/2013 | Lu ..................... B62J 1/08 297/195.1 |
| 8,668,259 B2 | 3/2014 | Ulrich |
| 8,911,012 B2 * | 12/2014 | Choi ................. B62J 1/04 297/215.15 |
| 2007/0164590 A1 * | 7/2007 | Hsiao ............... B62J 1/08 297/215.15 |
| 2007/0262623 A1 | 11/2007 | Fortt |
| 2011/0260511 A1 | 10/2011 | Sirjord |

FOREIGN PATENT DOCUMENTS

| | | |
|---|---|---|
| CN | 2525007 Y | 5/2001 |
| CN | 2525008 Y | 2/2002 |
| CN | 2688584 Y | 4/2004 |
| GB | 2493248 A | 1/2013 |
| KR | 20000054829 A | 6/2000 |
| WO | 9815424 A1 | 4/1998 |
| WO | 2012154104 A1 | 11/2012 |

* cited by examiner

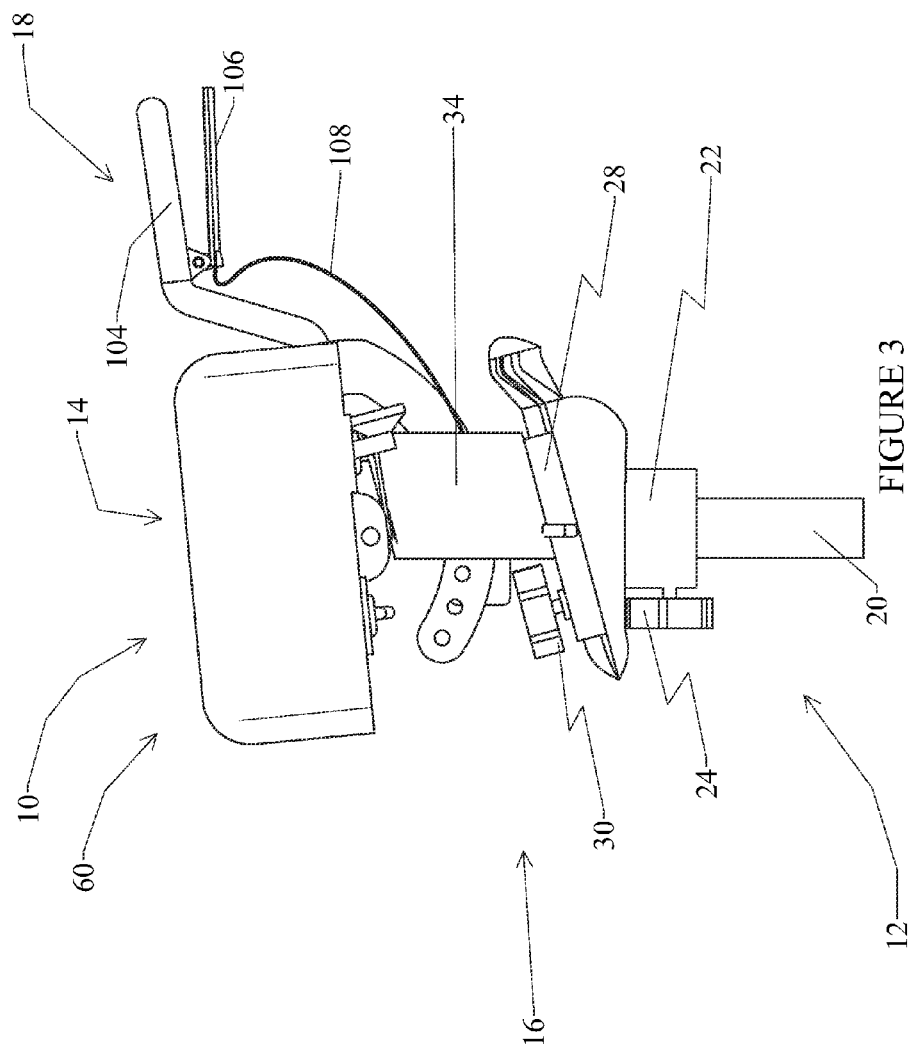

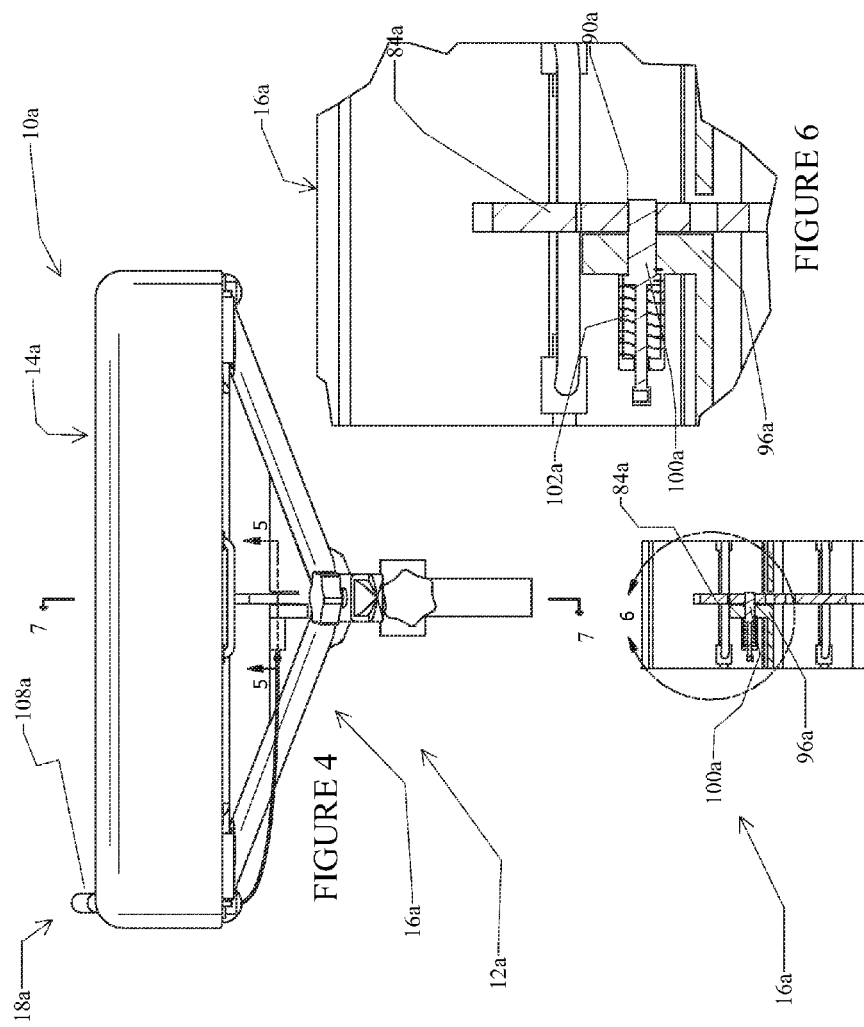

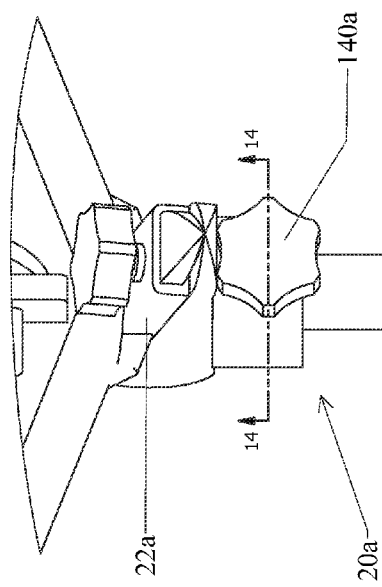
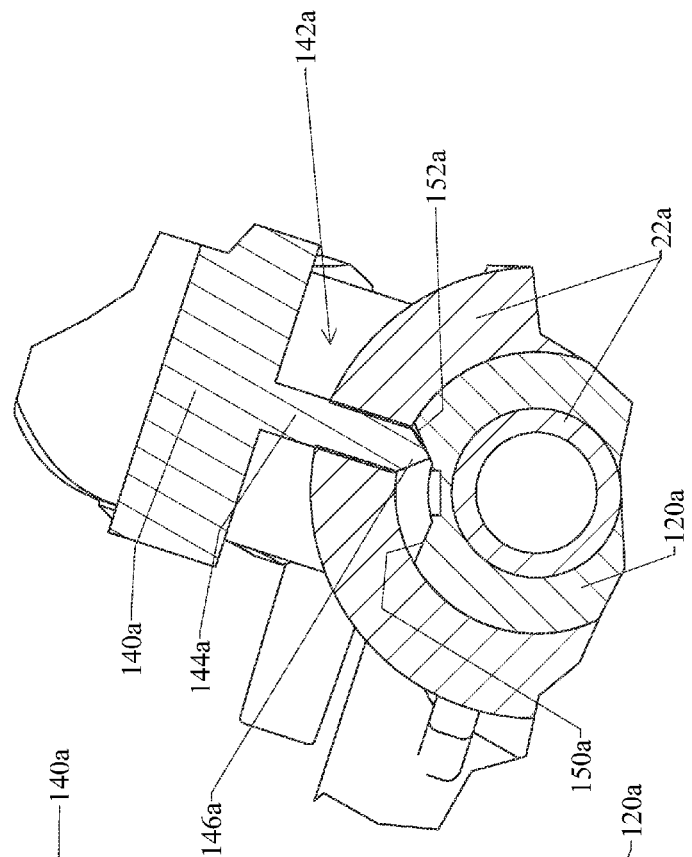
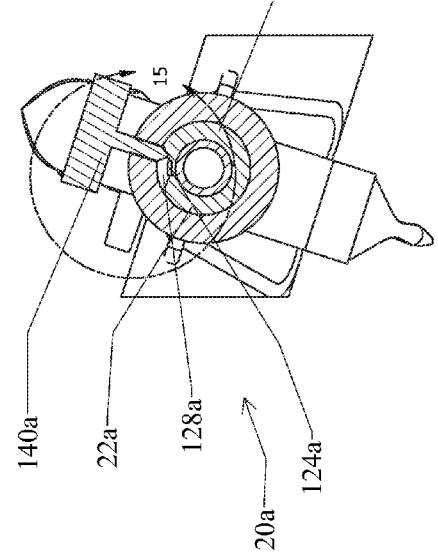
FIGURE 13
FIGURE 14
FIGURE 15

BICYCLE SEAT ASSEMBLY

BACKGROUND

1. Field

The present disclosure relates to bicycle seats.

2. Description of Related Prior Art

U.S. Pat. No. 5,921,625 discloses a MOUNTING STRUCTURE FOR CYCLE SEAT. A cycle seat is mounted to a cycle frame so that the seat will rotate in a horizontally-inclined plane on an upwardly extending axis. The seat extends transversely on opposite sides of the axis of rotation and has a lobed structure in which a gently-rounded front is disposed between two rearwardly-extending wing-like portions. Structure is also provided to adjust the vertical inclination of the axis of rotation so as to vary the attitude of the seat relative to the cycle frame. The seat and associated mount allow the rider to sit more naturally, more comfortably, for longer periods of time.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A bicycle seat assembly can include a mounting portion, a seat portion, a locking portion, and an actuator portion. The mounting portion can be configured to engage a frame of a bicycle. The seat portion can be pivotally mounted to the mounting portion. The locking portion can be disposed to selectively lock the mounting portion and the seat portion with respect to one another in a plurality of different seat positions. The seat portion can be moveable among the plurality of different seat positions when the locking portion is in an unlocked configuration and can be fixed in one of the plurality of different seat positions when the locking portion is in a locked configuration. The actuator portion can be engaged with the locking portion and operable to shift the locking portion from the locked configuration to the unlocked configuration. The actuator portion can be hand-operated.

A bicycle seat assembly can include a mounting portion and a seat portion. The mounting portion can be configured to engage a frame of a bicycle. The seat portion can be engaged with the mounting portion. The seat portion can include a frame, a fabric member, and at least one tension adjuster. The frame can define a perimeter and an opening within the perimeter. The fabric member can be arranged on the frame and extend across the opening. The at least one tension adjuster can be operably engaged with the fabric member to adjust a tautness of the fabric member in a lateral direction of the seat portion.

BRIEF DESCRIPTION OF THE DRAWINGS

The detailed description set forth below references the following drawings:

FIG. 3 is a lateral view of the bicycle seat assembly shown in FIGS. 1 and 2;

FIG. 4 is a front view of a bicycle seat assembly incorporating an exemplary embodiment of the present disclosure;

FIG. 5 is a partial cross-section taken along section lines 5-5 in FIG. 4;

FIG. 6 is a detail view taken along detail line 6 in FIG. 5;

FIG. 13 is a perspective view of a portion of a bicycle seat assembly incorporating an exemplary embodiment of the present disclosure;

FIG. 14 is a cross-section taken along section lines 14-14 in FIG. 13; and

FIG. 15 is a detail view taken along detail line 15 in FIG. 14.

DETAILED DESCRIPTION

Figure 1:
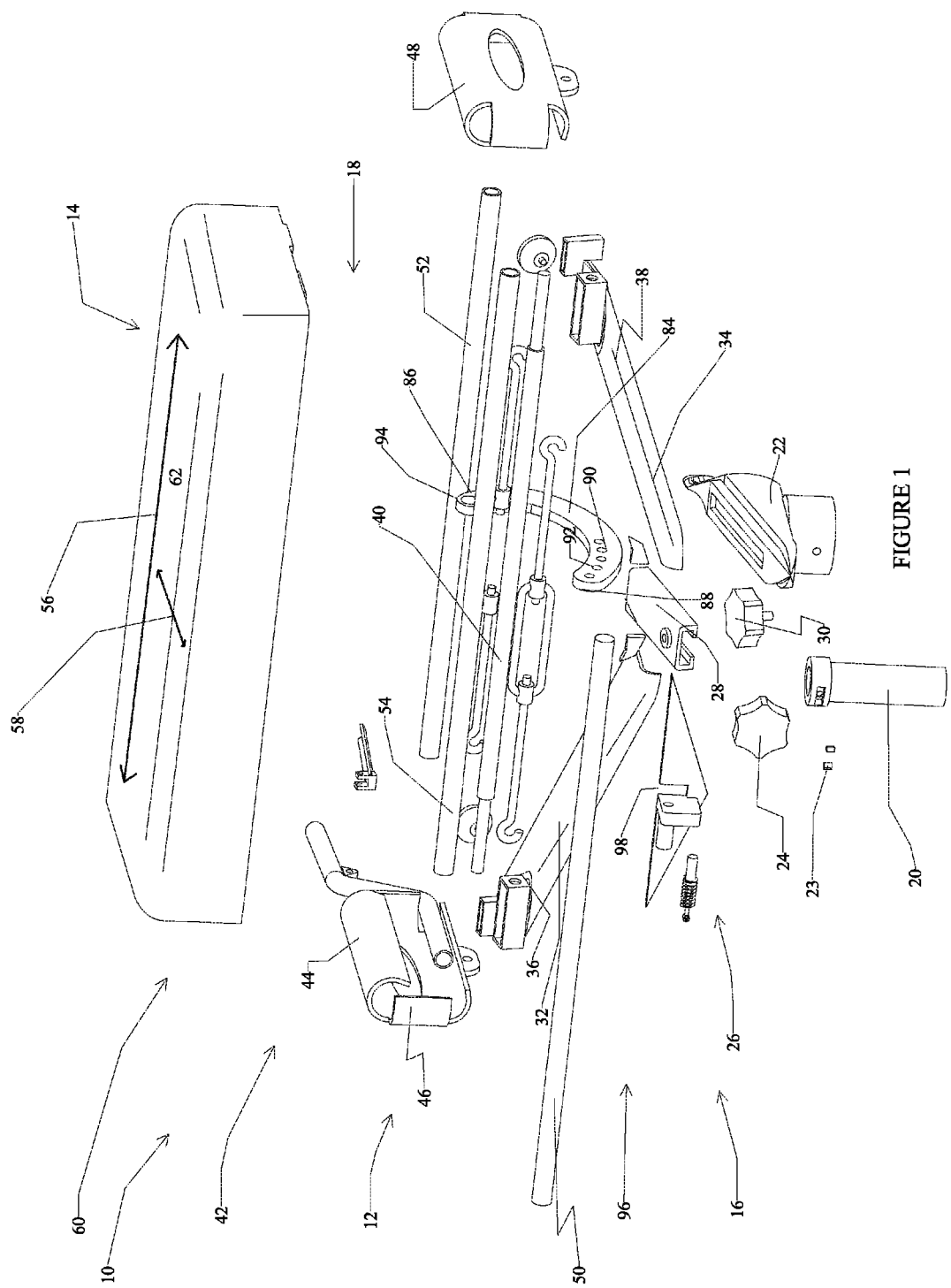
FIG. 1 is an exploded view of a bicycle seat assembly incorporating an exemplary embodiment of the present disclosure.

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Similar features in a particular embodiment have been numbered with a common two-digit, base reference numeral and have been differentiated by a different leading numeral. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The present disclosure is applicable to bicycle seats and provides a system capable of enhancing rider comfort and efficiency. One or more embodiments of the present disclosure can provide novel riding methods not possible with at least some conventional saddle designs.

The rider can sit on a load bearing component of the system that takes the form of a fabric member or pouch stretched over a framework and held in place by adjustable tensioners. This fabric component can be interchangeable easily with other variants, each serving a specific need. For example, a loose weave fabric member can be utilized to maximize ventilation for warm weather. A fabric member can include a pouch for containing a cooling pad or a heating pad. A fabric member can be decorated with images or patterns to suit the rider's personal taste. A fabric member can be coated with a non-slip coating. Fabrics for the fabric member can be chosen from those that have the desired properties, such as linen, hemp, Kevlar, or other fabrics.

This load-bearing component can exhibit a number of subtle but nevertheless desirable ergonomic innovations. For example, the seat can isolate the rider from the effect of shocks transmitted through the bicycle frame as well as providing a form-fitting, comfortable surface supporting the weight of the rider. There may not be any points of direct contact between the rider's anatomy and the underlying rigid framework. The material of the fabric member can be stretched so a firm but somewhat flexible surface takes the primary load, the weight of the rider. The fabric member can be assembled in the form of a pouch with tabs underneath that is fitted over a frame. A front panel of the pouch can be combined with the curved surface connecting it to the top surface. This serves to spread out and soften any contact between the rider's legs and the front edge of the seat while pedaling. Because there is no direct support for the fabric front panel, it will tend to reshape somewhat under light load. This will increase the comfort of the rider while not compromising support.

The rider can also dynamically change the angle of attack of the load-bearing surface so the plane of this surface can be parallel to the long axis of the back of the rider's legs at the bottom most extreme of the pedaling stroke. The load bearing surface can be hinged in such a way that it moves slightly forward as the angle is increased, pushing the rider's center of mass further over the pedals. Increasing the angle of attack of the load bearing surface allows the rider to control how his/her weight is distributed between the handlebars, the pedals, and the seat surface. It also serves to minimize contact between the back of the rider's legs and the seat pouch front panel.

The frame supporting the fabric member can include two end pieces fashioned from sheet metal, and interconnecting rods that establish the distance between and support for the end pieces. The end pieces can be fabricated from the flat pattern using CNC tools. Once bent into shape, the end pieces can present only rounded edges that will not put focused stress on the fabric component. The end pieces can permit dynamic changes in the angle of the load-bearing surface with respect to gravity. This can be implemented by means of a lever located at the level of the load-bearing surface on one side or the other, projecting from the back of the seat frame. It can be connected by a cable to a spring set pin that fixes the position of a holed and curved plate projecting down from the back of the seat connected to the rearmost transverse support member.

One consideration underlying at least one embodiment can be the notion that edges are a source of failure in a repetitive strain environment, so it can be desirable to keep load bearing surfaces rounded. The open frame design can allow for maximum strength while keeping the weight to a minimum. Pitch control allows for optimization of the load bearing surface for riding conditions. Projecting the pitch adjustment handle towards the rear at the level of the load bearing surface may help increase the likelihood that it will not become a source of injury in a fall, while still being within reach while riding.

A support framework for the seat assembly can consist of two side wings connected at the bottom and connected at the top by a transverse tubular member to form a rigid triangular shape. At the V intersection of the triangle at the bottom, a welded cross flange with a notch cut can allow for the movement of the holed curved plate from the load bearing framework component through it. This arm allows the rider to dynamically fix the angle of attack of the load bearing surface. A side flange attached to the transverse flange can mount a small enclosure containing a spring-loaded pin that centers on the holes in the curved plate and is connected to the pitch adjustment handle via a shrouded cable. Attached at the bottom of the triangle can be a support bracket meant to slide in the longitudinal adjustment component. It can be equipped with a set screw to control its movement and position and is used to fix the for/aft position of the seat assembly.

The triangle shape of this exemplary component can reduce unwanted flexing while providing for the transfer of vertical forces (such as the weight of the rider) on the horizontal lever arm to the center seat post. This leaves only lateral forces putting a torsion load at the primary connection point at the bottom of the frame, with the lever arm along the vertical axis of the frame. These forces are typically much smaller than the vertical forces exerted on the frame, so the framework is much more robust as a consequence. This framework provides for the mounting of useful and/or decorative features such as tail and signal lights.

The open frame supporting the fabric member can consist of a machined rectangular rail designed with horizontal slots on either side to fix the fabric member in place. Attached beneath is a cylinder that fits over a complimentary insert attached to the lower support post. A set screw located on the front is used to fix it in place or when loosened allow for the limited rotation of the entire upper seat assembly in conjunction with the pedaling action of the rider.

The fore/aft movement of the seat assembly is intended to accommodate the rider's personal preferences and physical differences. The rotational motion, if enabled, is intended to allow the seat load-bearing surface to swing with the movement of the rider's legs. Specifically, the full rotational arc can be between twenty degrees and sixty degrees by means of rubber bumpers in the horizontal slot that accommodates the set screw movement in the cylinder at the top of the supporting post. The rubber bumpers absorb any shock that may occur when the seat has reached one or the other extreme of its rotational arc. This restriction is intended to eliminate unwanted stresses on the rider's spine that might otherwise occur with unrestricted rotational movement. Furthermore, since the axis of rotation is at approximately a fifteen degree angle with respect to the vertical axis, the rotation is actually a combination of horizontal and vertical movement. This more naturally follows the travel arc of the rider's leg while pedaling. The arc of rotational swing of the seat assembly subtly increases as the seat is adjusted towards the rear. This movement can be controlled according to the rider's preference, and adds another means of setting the riding conditions by the rider.

A post of the system can consist of an upper cylinder attached to a lower tube that is inserted into the bicycle frame. A vertical position of the seat can be adjusted by moving the entire assembly up and down in this frame opening. This is a conventional means of adjusting bicycle seat height. The upper cylinder can have a machined horizontal slot to allow the movement of the set screw around the longitudinal axis of the post, and consequently the rotation of the entire seat assembly. The set screw also keeps the upper components attached to the post component.

Figure 2:
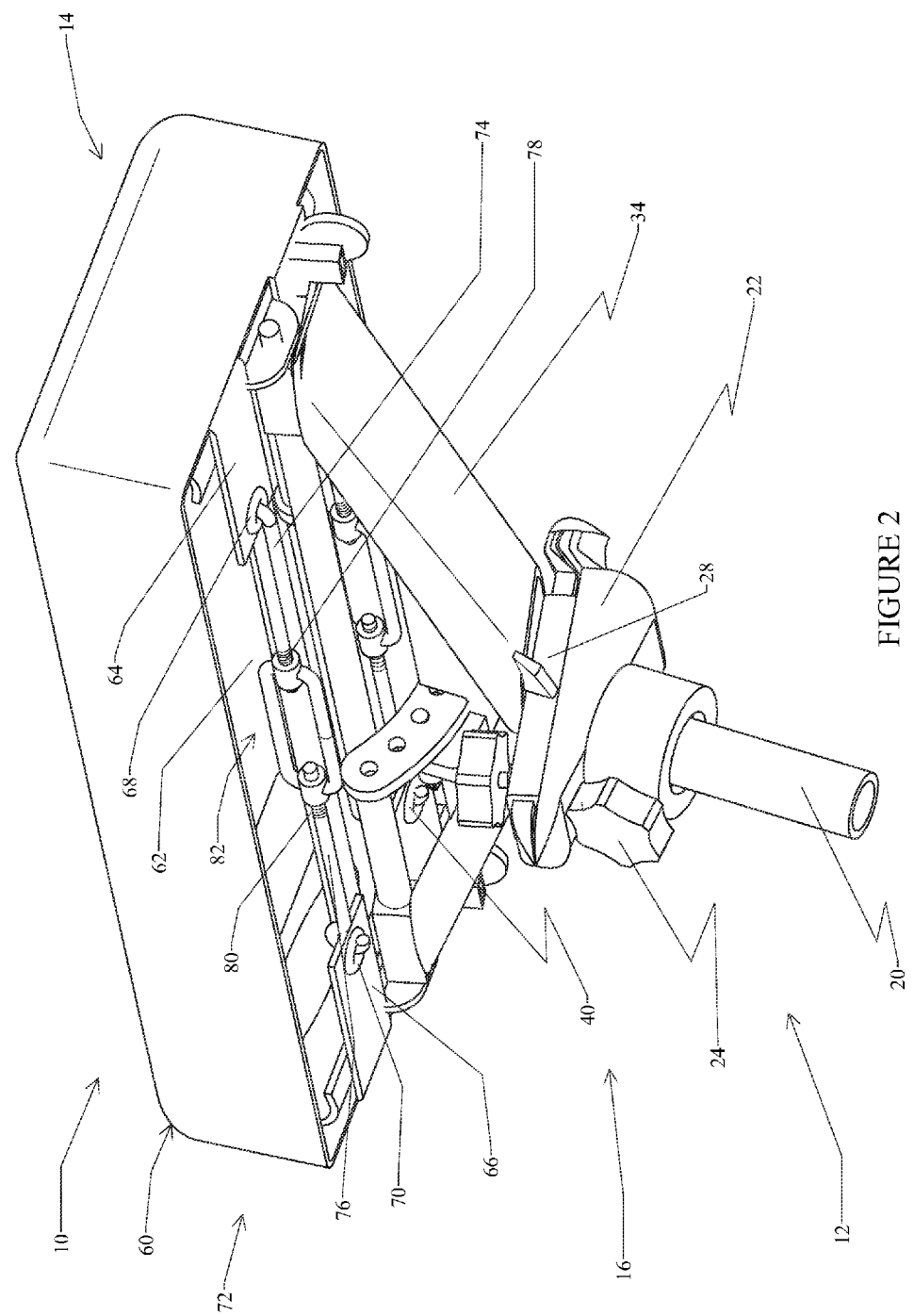
FIG. 2 is a perspective view of the bicycle seat assembly shown in FIG. 1.

Referring now to FIGS. 1-3, an exemplary bicycle seat assembly 10 can include a mounting portion 12, a seat portion 14, a locking portion 16, and an actuator portion 18. The mounting portion 12 can be configured to engage a frame of a bicycle. The mounting portion 12 can include a post 20 configured to engage the frame of the bicycle. The post 20 can be inserted into a bicycle frame seat clamp to be mounted on the bicycle. The mounting portion 12 can also include a base 22 configured to engage the frame of the bicycle, such as through the post 20. The base 22 and the post 20 can be releasably interconnected through a set screw assembly 24. As illustrated, the set screw assembly 24 can include an enlarged knob portion graspable by hand and a threaded portion receivable in an aperture of the base 22.

The mounting portion 12 can also include a frame assembly 26 operably disposed between the base 22 and the seat portion 14. The frame assembly 26 can include a runner 28 slidably received, tongue and groove style, on the base 22. A position of the frame assembly 26 relative to the base 22 can be adjustable in a fore-aft direction by sliding the runner 28 along the base 22. The position of the runner 28 relative the base 22 can be fixed by a set screw 30.

The frame assembly 26 can include first and second beams 32, 34 engaged with the base 22, such as through the runner 28. The first and second beams 32, 34 can be fixed to the runner 28, such as by welding. Each of the first and second beams 32, 34 can extend to respective distal ends 36, 38 spaced from the base 22.

The seat portion 14 can be pivotally mounted at the distal ends 36, 38. A cross-member 40 can extend between the distal ends 36, 38 and the seat portion 14 can pivot about the cross-member 40. The exemplary cross-member 40 is a tube that can form the top of a support triangle holding up the seat portion 14; the beams 32 and 34 can define the other sides of the support triangle. The cross-member 40 can thus be structural and can also define an enclosure into which is inserted a cross-member 50; the cross-member 50 can serve as the point of attachment of lower flange pieces of each of two end members 46, 48 as well as an axis of rotation for adjusting the angle of attack of the seat portion 14. The seat portion 14 can include an open frame 42 defining a perimeter and an opening 44 within the perimeter. The exemplary perimeter can be defined by the first and second end members 46, 48 and by first and second cross-members 50, 52. A third cross member 54 can extend laterally, between the first and second end members 46, 48. The lateral axis is referenced at 56. The third cross member 54 can be positioned between the first and second cross-members 50, 52 in the fore-aft direction. The fore-aft axis is perpendicular to the lateral axis and is referenced at 58. The third cross member 54 can be positioned above the cross-member 40.

The seat portion 14 can also include a fabric member 60 arranged on the open frame 42. The fabric member 60 can be arranged on the frame 42 and extend across the opening 44. The fabric member 60 can include a sheet portion 62 covering the opening 44 and tabs (such as tabs 64, 66) extending from opposite lateral sides of the sheet portion 62. The third cross member 54 can be positioned below the sheet portion 62 of the fabric member 60 and above the tabs. The fabric member 60 can also include eyelets (such as eyelets 68, 70) mounted in the tabs.

The seat portion 14 can also include first and second tension adjusters. In the exemplary embodiment, the first and second tension adjusters are identical, but could be different in other embodiments of the present disclosure. Further, other embodiments could include one tension adjuster or more than two tension adjusters. An exemplary tension adjuster is referenced at 72. The exemplary tension adjuster 72 can be operably engaged with the fabric member 60 to adjust a tautness of the fabric member 60 across the open frame 42. The tension adjuster 72 can be operably engaged with the fabric member 60 to adjust a tautness of the fabric member 60 in a lateral direction of the seat portion 14.

The exemplary tension adjuster 72 includes hook members 74, 76 each having a hook portion received in one of the eyelets 68, 70. Each hook member 74, 76 includes a threaded end 78, 80 opposite the hook portions. The exemplary tension adjuster 72 also includes a linking member 82. The linking member 82 can include threaded apertures each receiving one of the threaded ends 78, 80. The threads of the linking member 82 can be arranged such that the hook members 74, 76 are moved closer together when the linking member 82 is turned in a first rotational direction to pull the tabs 64 and 66 together and increase the tautness of the sheet portion 62. Further, the threads of the linking member 82 can be arranged such that the hook members 74, 76 are moved apart when the linking member 82 is turned in a second rotational direction opposite to the first direction to decrease the tautness.

The locking portion 16 can be disposed to selectively lock the mounting portion 12 and the seat portion 14 with respect to one another in a plurality of different seat positions. The seat portion 14 can be moveable among the plurality of different seat positions when the locking portion 16 is in an unlocked configuration. The seat portion 14 can be fixed in one of the plurality of different seat positions when the locking portion 16 is in a locked configuration.

The exemplary locking portion 16 can include a plate 84 extending between first and second ends 86, 88. The plate 84 can be arcuate and include a plurality of apertures, such as apertures 90, 92. The plate 84 can be engaged at the first end 86 with the seat portion 14. For example, the cross-member 52 can extend through an aperture 94 at the first end 86. The plate 84 can move along a path of movement in response to movement of the seat portion 14. The exemplary path is an arcuate path centered on the cross-member 40. The exemplary path is an orbital path about the cross-member 40. The path of movement can be centered laterally between the first and second beams 36, 38.

The exemplary locking portion 16 can also include a hub 96 engaged with the mounting portion 12 and positioned along the path of movement of the plate 84. The exemplary hub 96 can include a slot 98. The plate 84 can pass through and move within the slot 98 as the position of the seat portion 14 is adjusted.

Referring now to FIGS. 4-7, an exemplary bicycle seat assembly 10a can include a mounting portion 12a, a seat portion 14a, a locking portion 16a, and an actuator portion 18a. The mounting portion 12a can be configured to engage a frame of a bicycle. The locking portion 16a can be substantially similar to the locking portion 16. Both locking portions 16, 16a can include a locking pin. In the exemplary locking portion 16a, a locking pin 100a is mounted on a hub 96a. The locking pin 100a can be moveable between an extended position relative to the hub 96a and a retracted position. In the extended position, the locking pin 100a can extend through a portion of the hub 96a and through one of the apertures in a plate 84a, such as aperture 90a. The locking pin 100a can be biased to the extended position with a spring 102a. The locking pin 100a can be receivable in any one of the plurality of apertures when in the extended position. Each aperture of the plate 84a can thus define one of the plurality of seat positions. The locking portion 16a is thus as a positive lock. In alternative embodiments of the present disclosure, a locking portion could define a friction lock, similar to automotive braking systems.

Referring again to FIG. 3, the exemplary actuator portion 18 can be engaged with the locking portion 16 and can be operable to shift the locking portion 16 from the locked configuration to the unlocked configuration. The actuator portion 18 is hand-operated. A hand-operated device can be operated without tools. A tool such as a wrench or a screwdriver need not be disposed between the operator's hand (or held by the user's hand) and the locking device for the locking device to be shifted between the locked and unlocked configurations. As a result, the present disclosure provides an actuator portion that can be operated while the seat portion is in use and as the bicycle is in motion.

The exemplary actuator portion 18 is mounted on the seat portion 14. The exemplary actuator portion 18 can include a handle 104 and a lever 106 positioned for pivoting movement proximate to the seat portion 14. The exemplary lever 106 extends in the fore-aft direction of the seat portion 14. A sheathed cable 108 can extend between the lever 106 and the locking portion 16, such as the locking pin of the locking portion 16. In operation, the lever 106 and handle 104 can be grasped and urged together, causing the cable 108 to draw the locking pin out of the extended position and into the retracted position. The locking portion 16 is in the unlocked configuration when the locking pin is in the retracted position. When the user releases the lever 106, the locking pin can be biased back into the extended position.

Figure 7:
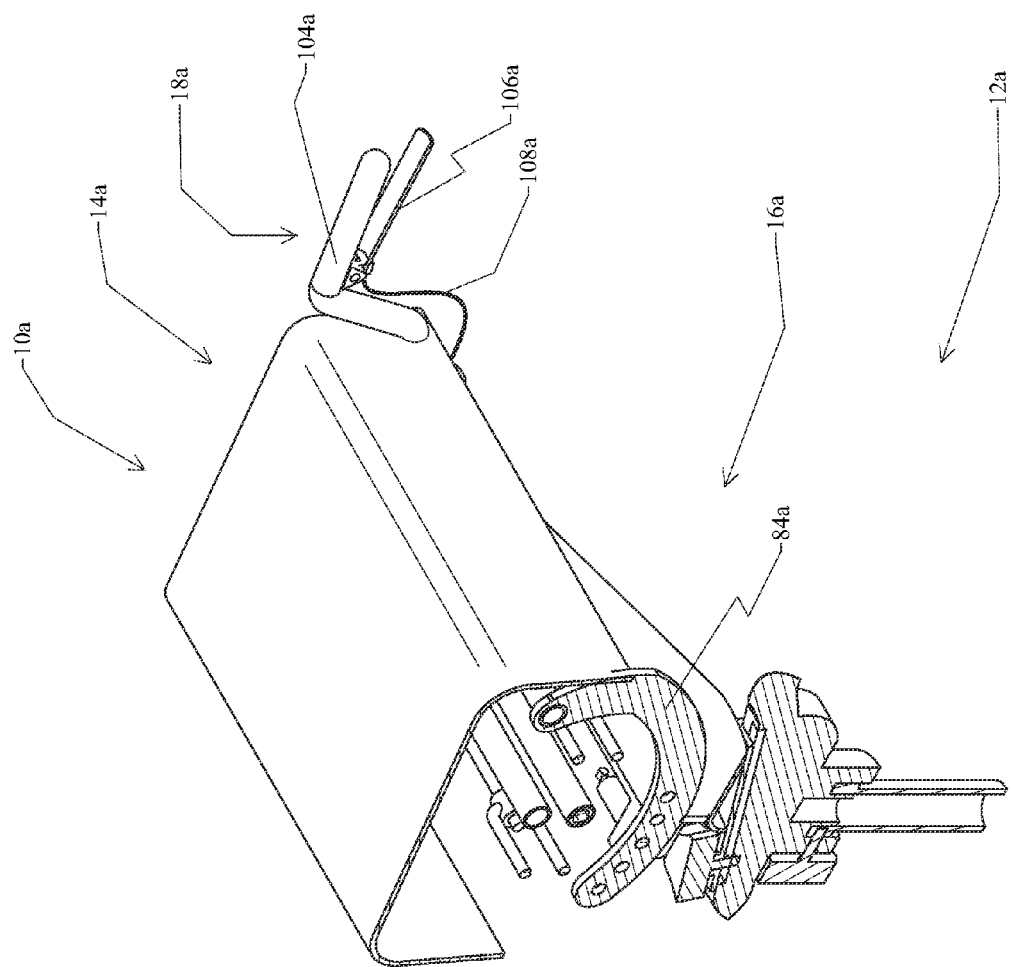
FIG. 7 is a partial cross-section in perspective view taken along section lines 7-7 in FIG. 4.

In another embodiment shown in FIGS. 4 and 7, the exemplary actuator portion 18*a* can include a handle 104*a* and a lever 106*a* positioned for pivoting movement proximate to the seat portion 14*a*. The exemplary lever 106*a* extends in the lateral direction of the seat portion 14*a*.

Figure 8:
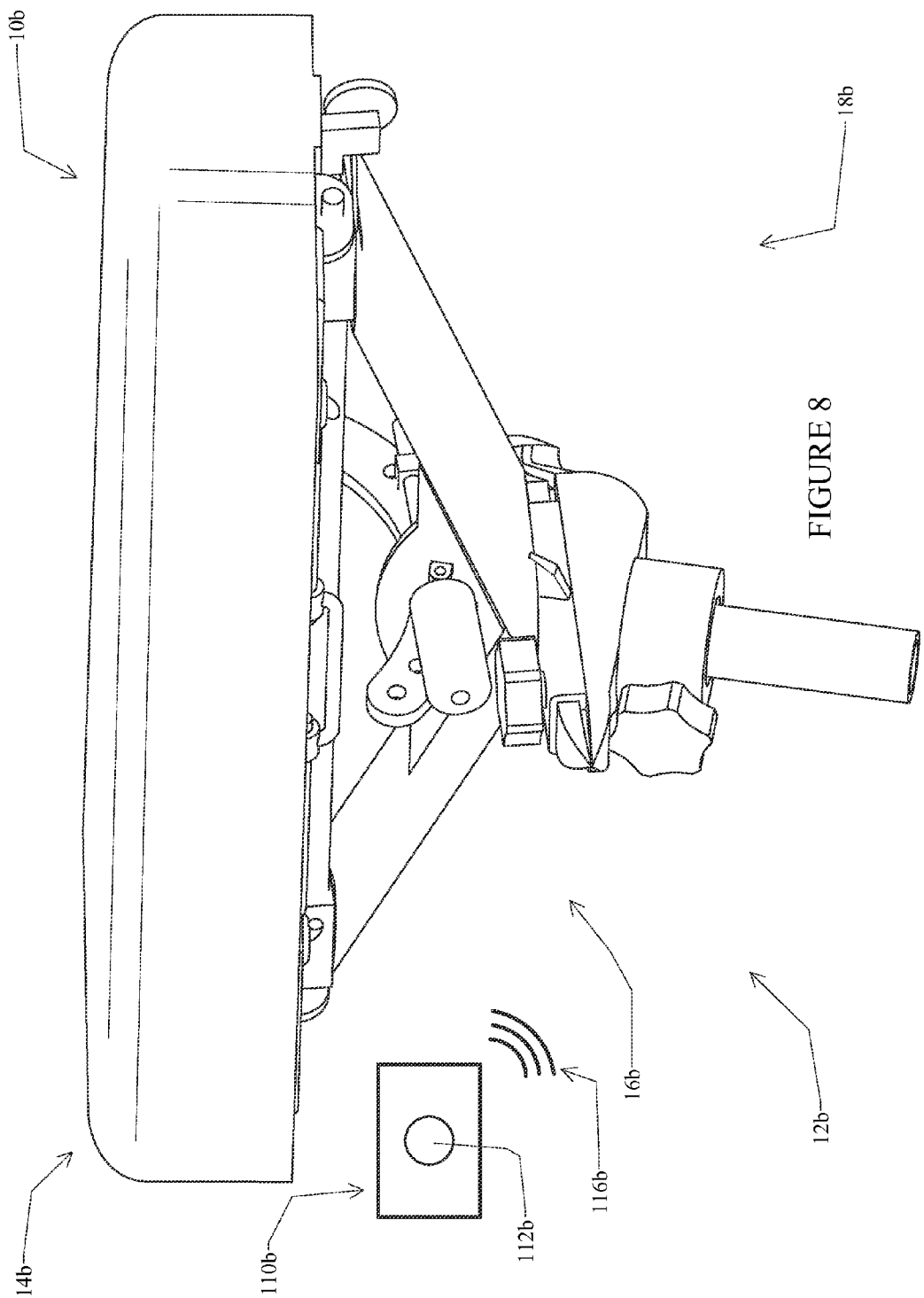
FIG. 8 is a perspective view of a bicycle seat assembly incorporating an exemplary embodiment of the present disclosure.
Figure 9:
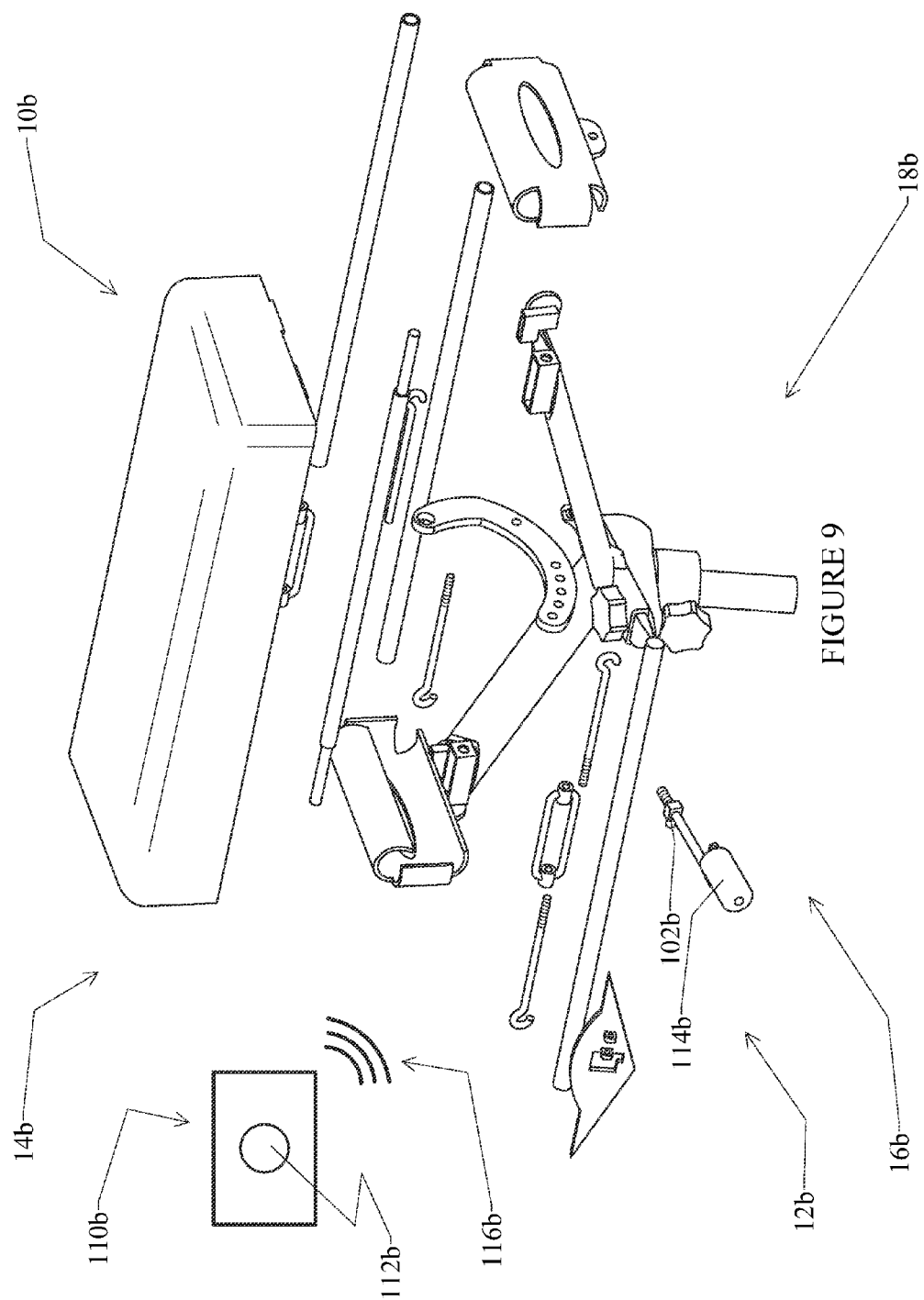
FIG. 9 is an exploded view of the bicycle seat assembly shown in FIG. 8.

Referring now to FIGS. 8 and 9, an exemplary bicycle seat assembly 10*b* can include a mounting portion 12*b*, a seat portion 14*b*, and a locking portion 16*b*. The mounting portion 12*b* can be configured to engage a frame of a bicycle. The locking portion 16*b* can be defined by a motor 114*b*; when the motor 114*b* is disengaged the seat portion 14*b* is locked. The exemplary bicycle seat assembly 10*b* can include an electronic, hand-operated actuator portion 18*b*. The actuator portion 18 can include an electronic button or switch 110*b* mountable on handle bars of the bicycle. The switch 110*b* can include a button 112*b* that can be pressed by the bicycle operator to shift the locking portion 16*b* to the unlocked configuration. The electronic switch 110*b* can also include a transmitter operable to transmit an electromagnetic signal, such as over Bluetooth. The signal is referenced at 116*b*. The signal can be transmitted in response to the user pressing the button 112*b*. The button 112*b* can be operable to transmit two or more different signals, such as a first signal that causes the motor 114*b* to rotate its shaft in a first direction and second signal that causes the motor 114 to rotate its shaft in a second direction opposite to the first direction. The motor 114*b* of the locking portion 18*b* responds to signals generated by the switch 110*b*. The motor 114*b* can be pivotally mounted to the mounting portion 12*b*. The shaft of the motor 114*b* can be received in a nut pivotally mounted to a plate such as plate 84.

When the user desires to change the position of the seat portion 14*b* in a first direction, the button 112*b* can be pressed in a first direction to emit a first signal and cause the motor 114 to rotate in a first direction. The shaft of the motor 114*b* acts as a worm and the nut acts as a ball screw by moving rectilinearly along the shaft. This causes tilting movement of the seat portion 14*b* in the first direction. When the user has achieved a desired position of the seat portion 14*b*, the user can stop pressing the button 112*b*.

When the user desires to change the position of the seat portion 14*b* in a second direction, the button 112*b* can be pressed in a second direction to emit a second signal and cause the motor 114 to rotate in a second direction. The shaft of the motor 114*b* acts as a worm and the nut acts as a ball screw by moving rectilinearly along the shaft. This causes tilting movement of the seat portion 14*b* in the second direction. When the user has achieved a desired position of the seat portion 14*b*, the user can stop pressing the button 112*b*. The first and second directions are opposite directions of tilting movement.

In one or more embodiments of the present disclosure, the motor drive option for the locking portion can consist of a reversible direct current motor, a gear reduction drive, and a shaft that extends from and is actuated by the motor. A distal end of the shaft can be threaded and inserted into a nut that has a pin oriented at a right angle to the direction of the shaft. The pin can be received in a slot defined in a plate (such as plate 84 modified to have a slot instead of apertures). When the shaft is stationary, it serves to automatically lock the plate and hence the seat portion angle of attack. When rotating one direction or the other, the nut moves along the threads of the shaft and the slot in the plate and consequently causes the seat portion to rotate.

Figure 10:
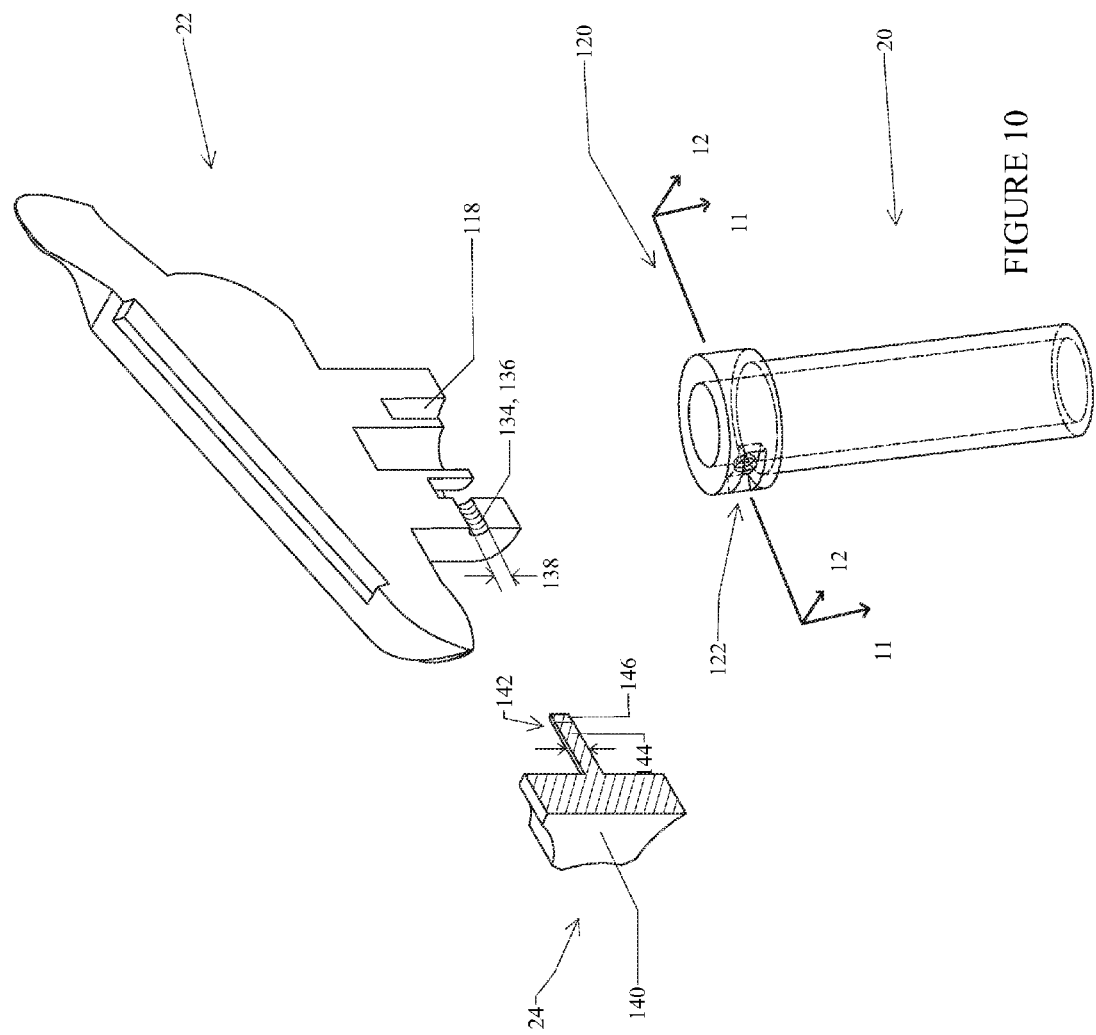
FIG. 10 is an exploded view with a base shown in partial cross-section.
Figure 11:
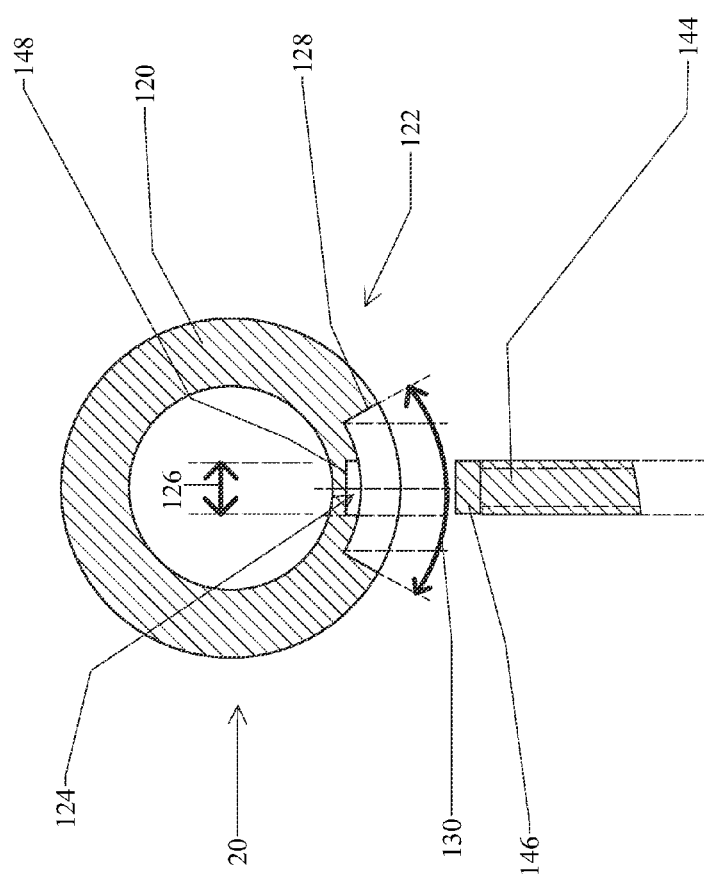
FIG. 11 is a cross-section taken along section lines 11-11 in FIG. 10.
Figure 12:
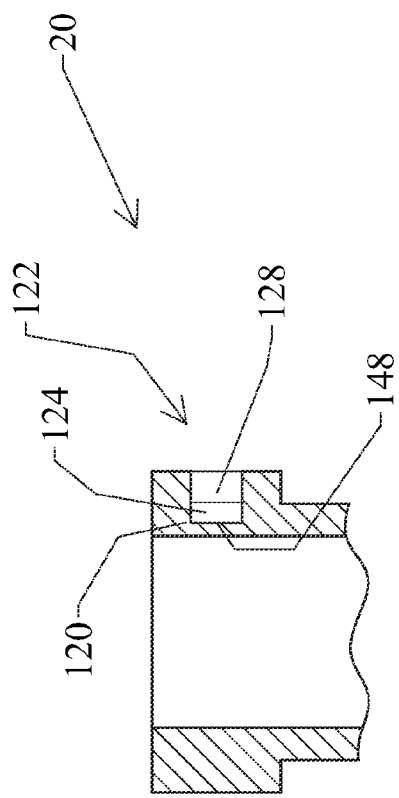
FIG. 12 is a cross-section taken along section lines 12-12 in FIG. 10.

FIG. 10 is an exploded view with the base 22 shown in partial cross-section. FIG. 11 is a cross-section taken along section lines 11-11 in FIG. 10. FIG. 12 is a cross-section taken along section lines 12-12 in FIG. 10. The plane shown in FIG. 11 is perpendicular to the plane shown in FIG. 12. The base 22 and the post 20 can be releasibly interconnected through a set screw assembly 24. The exemplary base 22 can define an annular notch 118. The exemplary post 20 can include a ring portion 120 received in the annular notch 118. The annular notch 118 and the ring portion 120 can be sized such that the annular notch 118 and the ring portion 120 are freely rotatable relative to one another but cannot shift laterally with respect to one another. In other words, the fit between the annular notch 118 and the ring portion 120 allows relative rotation but is not sloppy.

The post 20 can be configured to engage the frame of the bicycle as set forth above. The post 20 can include a blind aperture 122. The blind aperture 122 can include a first portion 124 having a first width 126 and a second portion 128 having a second width 130 greater than the first width 126.

The base 22 can be mountable on the post 20 and have an open aperture 134 alignable with the blind aperture 122. The open aperture 134 can have at least a portion with threads (referenced at 136) and a third width 138 greater than the first width 126. In some embodiments, the second width and the third width can be equal.

The set screw assembly 24 can include an enlarged knob portion 140 graspable by hand. The set screw assembly 24 can also have a screw 142 with a threaded portion 144 with a tip portion 146 receivable in the first portion 124 of the blind aperture 122. The threaded portion 144 can be receivable in the threaded portion 136 of the open aperture 134.

The tip portion 146 can be receivable and pass through the open aperture 134. The tip portion 146 can have a diameter slightly less that the first diameter 126. The tip portion 146 and the first portion 124 can be sized such that the tip portion 146 and the first portion 124 are freely rotatable relative to one another but cannot shift laterally with respect to one another. In other words, the fit between the tip portion 146 and the first portion 124 allows relative rotation but is not sloppy. It is noted that a portion of the threaded portion 144 could extend through the open aperture 134 and be received in the second portion 128 of the blind aperture 122.

The engagement between the base 22 and the post 20 allows the seat portion 14 to pivot about the post 20 or be locked with respect to the post 20 (and the bicycle itself). A user can rotate the set screw assembly 24 in a first rotational direction until the tip portion 146 presses against the blind end 148 of the blind aperture 122. This engagement between the tip portion 146 and the blind end 148 can lock the base 22 (and thus the seat portion 14) relative to the post 20 (and thus the bicycle itself). A user can rotate the set screw assembly 24 in a second rotational direction opposite to the first rotation direction until the tip portion 146 passes out of the first portion 124 of the blind aperture 122 and extends in the second portion 128. Since the diameter of the second portion 128 is larger than the diameter of the tip portion 146, the base 22

(and thus the seat portion 14) can pivot about the post 20. End limits of the pivoting movement are defined when the tip portion 146 comes into contact with opposite sides of the second portion 128. Alternatively, rubber bumpers may be disposed on opposite sides of the second portion. The tip portion 146 would then come into contact with one of the bumpers during at each end limit of travel. Exemplary bumpers are referenced at 23 in FIG. 1.

In one or more embodiments, the continuously variable diameter of the second portion 128 allows the operator to select a variable amount of pivoting movement. The extent of pivoting movement can be greater as the angle of rotation of the set screw assembly 24 in the second rotation direction is greater. The extent of pivoting movement can be between twenty degrees and sixty degrees in various embodiments.

In one or more embodiments, the tip portion could be tapered so that relatively sharp edges would not be repeatedly impacting a flat or sloped face of the second portion or rubber bumpers. In such embodiments, it may be desirable to increase the diameter of the ring portion 20 to allow for a large range of pivoting angles. One or more embodiments could include a feature that would allow the rider to ensure that the tip portion 146 is rotated so the flat tapered surfaces are coplanar with the corresponding contact surfaces of the second portion 128. This could be as simple as a mark on the knob that can be aligned with a mark on the base.

FIGS. 13-15 show such an alternative embodiment. FIG. 13 shows a base 22a mount on a post 20a. A knob 140a of a set screw is also illustrated. FIG. 14 shows the post 20a having a ring portion 120a with an aperture having a first portion 124a and a second portion 128a. FIG. 15 shows the second portion 128a having tapered side walls 150a, 152a. FIG. 15 shows the knob 140a being attached to a screw 142a having a threaded portion 144a and a tip portion 146a. The tip portion 146a has a tapered profile substantially corresponding to the taper of the side walls 150a, 152a.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. Further, the "present disclosure" as that term is used in this document is what is claimed in the claims of this document. The right to claim elements and/or sub-combinations that are disclosed herein as other present disclosures in other patent documents is hereby unconditionally reserved.

What is claimed is:

1. A bicycle seat assembly comprising:
    a mounting portion configured to engage a frame of a bicycle;
    a seat portion pivotally mounted to said mounting portion;
    a locking portion disposed to selectively lock said mounting portion and said seat portion with respect to one another in a plurality of different seat positions, wherein said seat portion is moveable among said plurality of different seat positions when said locking portion is in an unlocked configuration and is fixed in one of said plurality of different seat positions when said locking portion is in a locked configuration;
    an actuator portion engaged with said locking portion and operable to shift said locking portion from said locked configuration to said unlocked configuration, wherein said actuator portion is hand-operated; and
    wherein said mounting portion further comprises:
    a post configured to engage the frame of the bicycle, the post having a blind aperture including a first portion having a first width and a second portion having a second width greater than said first width;
    a base mountable on said post and having an open aperture alignable with said blind aperture and having at least a portion with threads and a third width greater than said first width; and
    a set screw assembly having a screw with a tip portion receivable in said first portion of said blind aperture and a threaded portion receivable in said at least a portion of said open aperture, whereby said base is rotatable relative to said post.

2. The bicycle seat assembly of claim 1 wherein said mounting portion further comprises a frame assembly operably disposed between said base and said seat portion, wherein a position of said frame assembly relative to said base is adjustable in a fore-aft direction, and wherein said seat portion is pivotally moveable relative to said frame without changing a position of said frame relative to said base in the fore-aft direction.

3. The bicycle seat assembly of claim 2 wherein said seat portion further comprises:
    an open frame;
    a fabric member arranged on said open frame; and
    a tension adjuster operably engaged with said fabric member to adjust a tautness of said fabric member across said open frame.

4. The bicycle seat assembly of claim 1:
    wherein said actuator portion is mounted on said seat portion;
    wherein said actuator portion further comprises a lever positioned for pivoting movement proximate to said seat portion; and
    wherein said lever extends in a lateral direction of said seat portion.

5. The bicycle seat assembly of claim 4 wherein said actuator portion further comprises:
    a cable extending between said lever and said locking portion.

6. The bicycle seat assembly of claim 4 wherein said locking portion is further defined as a positive lock.

7. The bicycle seat assembly of claim 4 wherein said locking portion further comprises:
    a plate extending between first and second ends and having a plurality of apertures, wherein said plate is engaged at said first end with said seat portion and moves along a path of movement in response to movement of said seat portion;
    a hub engaged with said mounting portion and positioned along said path of movement of said plate; and
    a locking pin mounted on said hub, said locking pin moveable between an extended position relative to said hub and a retracted position, said locking pin receivable in one of said plurality of apertures when in said extended position.

8. The bicycle seat assembly of claim 7 wherein said plate is arcuate.

9. The bicycle seat assembly of claim 7 wherein said mounting portion further comprises:
    first and second beams engaged with said base and extending to respective distal ends spaced from said base, wherein said seat portion is pivotally mounted to said distal ends, and wherein said path of movement is centered between said first and second beams.

\* \* \* \* \*